United States Patent [19]
Drott

[11] Patent Number: 4,890,859
[45] Date of Patent: Jan. 2, 1990

[54] LEVEL REGULATOR FOR AUTOMOTIVE VEHICLES

[75] Inventor: Peter Drott, Frankfurt am Main, Fed. Rep. of Germany

[73] Assignee: Alfred Teves GmbH, Frankfurt am Main, Fed. Rep. of Germany

[21] Appl. No.: 245,420

[22] Filed: Sep. 16, 1988

[30] Foreign Application Priority Data

Sep. 17, 1987 [DE] Fed. Rep. of Germany ....... 3731279

[51] Int. Cl.$^4$ .......................... B60G 17/04; B60T 8/00
[52] U.S. Cl. ..................................... 280/714; 180/41;
280/6.12; 280/DIG. 1
[58] Field of Search .................. 180/41; 280/714, 840,
280/6.12, DIG. 1

[56] References Cited

U.S. PATENT DOCUMENTS

| | | | |
|---|---|---|---|
| 2,954,987 | 10/1960 | Whelan | 280/714 |
| 4,030,777 | 6/1977 | Rabenseifmer | 280/714 |
| 4,453,736 | 6/1984 | Bergemann et al. | 280/714 |
| 4,673,172 | 6/1987 | Blanz | 280/DIG. 1 |
| 4,697,822 | 10/1987 | Blanz | 280/DIG. 1 |

FOREIGN PATENT DOCUMENTS 213020 3/1987 European Pat. Off. .

Primary Examiner—Kenneth R. Rice
Attorney, Agent, or Firm—Robert P. Seitter

[57] ABSTRACT

Disclosed is a level regulator for automotive vehicles, including a hydraulically operating level adjusting device located on at least one axle of the automotive vehicle. A fluid separator provided in the level regulator includes a hydraulic cylinder having at least one inlet pressure chamber confined by a hydraulic piston and separated from at least one outlet pressure chamber capable of being connected to the level adjusting device. Pressure is applied to the hydraulic piston by a restoring force acting in opposition to the pressure in the inlet pressure chamber. The inlet pressure chamber, through switch valves is capable of being temporarily connected to a primary hydraulic pressure source such as that for the brake system of the vehicle and, normally, is capable of being connected to a hydraulic fluid return reservoir. The fluid separator includes an input cylindrical housing in which is disposed a first piston portion closing the inlet pressure chamber. Attached to the inlet cylindrical housing is an output cylindrical housing accommodating a second piston portion closing the outlet pressure chamber. The first piston portion applies pressure to the second piston portion through a pushrod.

17 Claims, 5 Drawing Sheets

LEVEL REGULATOR FOR AUTOMOTIVE VEHICLES

BACKGROUND OF THE INVENTION

The present invention relates to a level regulating system for use with automotive vehicles of the type including a hydraulically operated level adjusting device located on at least one axle of the automotive vehicle, and a fluid separator comprising a hydraulic cylinder wherein at least one inlet pressure chamber is separated from at least one outlet pressure chamber by a hydraulic piston to which a restoring force acting in opposition to the pressure in the inlet pressure chamber is applied. The outlet pressure chamber is capable of being connected to the level adjusting device and the inlet pressure chamber which is normally in communication with a hydraulic fluid return reservoir is, through switching valves, put temporarily in communication with a hydraulic pressure source for a primary user of hydraulic pressure, such as a brake system of the automotive vehicle.

In level regulating systems for automotive vehicles of this type, a hydraulic pressure source provided in the automotive vehicle, e.g., a brake pressure source of a hydraulic brake force booster, is used for providing both the hydraulic pressure required for energizing a brake and during periods in which no braking is effected, for level control, wherein the pressure supplied by the brake or hydraulic pressure source, through a fluid separator, is passed on to the level adjusting device. For this purpose, a chamber adapted to the volume of the level adjusting means is required for the input and output pressure chamber in the hydraulic cylinder of the fluid separator. In addition, with the same transmission ratio, another space of equal volume is required to prevent the sealants from coming into contact with the surface wetted by the respectively other hydraulic fluid.

It is conventional to increase the pressure in the level adjusting means gradually rather than in one step so that the pressure chambers of the fluid separator do not have to have the entire volume of the level adjusting means. Although the space requirement of the fluid separator and the weight thereof can be reduced thereby, it is not always possible by simple means to adapt an existing hydraulic pressure source to the requirements of the level adjusting means.

SUMMARY OF THE INVENTION

It is an object of the present invention to provide a level controlling system of the general type described wherein the pressure supplied by the hydraulic pressure source, in accordance with the pressure and volume required by the level adjusting means, can be adjusted to the particular level adjusting means so as to insure level adjustment operation substantially free from delays.

This object, in accordance with the invention, is achieved by a fluid separator having an input cylindrical housing in which is located a first piston part confing a first input pressure chamber and an output cylindrical housing accommodating a second piston part confining an output pressure chamber and which is fixed to the input cylindrical housing. The first piston part, through a pushrod, applies pressure to said second piston part.

The structure of the fluid separator of the level controlling system in accordance with the invention, including the input and an output cylindrical housing, provides for specifically adapting the pressure prevailing on the input side to the pressure required on the output side by choosing a suitable effective piston diameter of the first and of the second piston part, in order to adjust the transmission of the fluid separator as desired. Also, the time needed for a required pressure increase to occur in the level adjusting means, is thereby adjustable to an optimum value since the cyclical time required for a single pressure increase, in response to the number of the required cycles, i.e., the individual pressure increasing steps, can be optimally adjusted.

To insure that each piston part can only come into contact with those cylindrical surfaces that are wetted by the associated hydraulic fluid, provision is made according to the invention, for the input cylindrical housing to have a step bore including a pressure chamber section and a separating section, where the separating section has a larger diameter than the pressure chamber section and the pushrod is substantially located in the separating section.

Because the separating section differs in diameter from the pressure chamber of the stepped bore, an internal circumferential face area is provided in the inlet cylindrical housing which cannot come into contact with one or the other piston portion.

According to another feature of the invention, the inlet cylindrical housing is flanged to the outlet cylindrical housing, thereby providing a particularly simple mounting capability for the two cylindrical housings and also permitting the use of one given inlet cylindrical housing, depending on the requirements, in connection with a variety of different output cylindrical housings. Similarly, an output cylindrical housing can be connected to a variety of input cylindrical housings.

To further reduce the time needed to complete a required level adjustment, provides for a first limit switch on the fluid separator which indicates an initial position of the hydraulic piston. The limit switch provided in accordance with the invention, and detecting the initial position of the hydraulic piston, insures that, immediately upon termination of a cycle, i.e., a pressure increasing process, the next cycle can be initiated, thereby avoiding waiting times between the individual cycles which would be otherwise required as the individual pressure increasing processes require different times, depending on the pressure prevailing in the level adjuster.

Another embodiment of the invention provides for the limit switch to be provided on the inlet cylindrical housing. Locating the limit switch on the inlet cylindrical housing in accordance with the present invention, provides for a compact design of the fluid separator.

In a preferred embodiment of the invention, provision is made for the limit switch to have a switching plunger protruding into the separating section of the stepped bore which cooperates with a radial flange provided on the first portion of the piston, with the switching plunger, at the end of the separating section adjacent the pressure chamber section, projecting thereinto. Advantageously, this provides for a particularly easy detection of the initial position of the piston without requiring any additional hydraulic sealants as the switching plunger protrudes into the separating section without coming into contact with one of the two hydraulic fluids. Accordingly, the limit switch can be provided on the fluid separator in a manner structurally simple and not involving any substantial or complicated structure.

To permit easy assembly of the fluid separator and the associated hydraulic switching valves, provision is made in a preferred embodiment of the invention for a switch valve block which accommodates the first and second switch valves associated with the input pressure chamber to be provided on the input cylindrical housing, with the switch valve block being integrally formed with the input cylindrical housing, thereby simplifying the assembly of the level regulator according to the invention into an automotive vehicle, as the hydraulic cylinder of the fluid separator can be mounted into the automotive vehicle with the switch valves provided thereon in a single unit such that the connection between the fluid seprator and the hydraulic pressure source need only be established by simple hydraulic conduits.

Another embodiment of the invention provides for passage in the output cylindrical housing opening in communication with a level regulating return flow reservoir and terminating in the output pressure chamber next to a seal on the second piston portion of the piston which seals the output pressure chamber, in the initial position of the piston, such that the passage opening upon a displacement of the piston from its initial position is blocked against the output pressure chamber. Due to this form of communication between the output pressure chamber of the hydraulic cylinder and the level regulating return flow reservoir which may be the return flow reservoir of an available power-steering mechanism, no separate shut-off valve is needed between the output pressure chamber and the level regulating return flow reservoir. Hence, an additional simplification of the level regulating system is achieved.

Moreover, according to another important feature of the invention, the second piston portion includes a central section of reduced diameter thereby forming an annular chamber surrounding the second piston portion, which annular chamber, through a check valve, can be connected to the output pressure chamber and is in communication with the level regulating return flow reservoir. The check valve is formed through axial bores provided in a front flange of the second piston portion and through the seal which seals the output pressure chamber, where the seal is a disk-type seal.

This establishes, in a manner structurally simple and compact, a communication between the output pressure chamber of the fluid separator and the level regulating return flow reservoir, which communication, upon a displacement of the piston from its initial position into its end position, is closed and, upon a displacement in the opposite direction, is open. This enables the output pressure chamber to be filled with hydraulic fluid once it is displaced back from its end position into its initial position. The fluid separator is ready for a new pressure increasing operation immediately after the piston reassuming its initial position.

According to another preferred embodiment of the invention, a valve accommodating chamber for a third switch valve associated with the output pressure chamber is provided on the output cylindrical housing, with the third switch valve being an electromagentically actuable 2-way/2-position valve which, in its inoperative position, acts as a check valve and in its operative position, is open. Due to the mounting of the third switch valve directly on the hydraulic cylinder of the fluid separator, a compact unit is provided that can be mounted into the automotive vehicle independently of other units. Because the third switch valve is open in its second switching position and is in communication with the passage opening connecting the output pressure chamber to the level regulating return flow reservoir, when the piston takes its initial position, an additional return conduit from the level adjusting circuit of the level adjusting device to the level regulating return flow reservoir can be eliminated since the return flow connection can be established through the third switch valve and the output pressure chamber.

To insure return of the hydraulic piston of the fluid separator to its initial position in a particularly simple manner, provision is made, in accordance with the invention, that pressure be applied to the hydraulic piston of the fluid separator by a restoring spring.

A most important feature of the invention is that the fluid separator includes a first piston portion to which pressure can be applied from two sides and which separates, in a first pressure chamber, the first input pressure chamber from a second input pressure chamber, and the second piston portion includes a first and a second piston section respectively closing the first or second output pressure chamber, and the two output pressure chambers, through check valves, are in communication with a level adjusting circuit of the level adjusting device.

Due to the tandem configuration of the fluid seprator, the time required for pressure to build-up in the level adjusting device is substantially reduced since, upon each displacement of the hydraulic piston in the cylinder of the fluid separator, a pressure increasing operation is carried out. Reduction in the re-suction time in which the output pressure chamber is filled with hydraulic fluid is also achieved since, during displacement of the piston, hydraulic fluid from one of the two output pressure chambers is forced into the level adjusting circuit, while the other output pressure chamber is filled during the displacement.

Another embodiment of the invention provides for a second limit switch on the fluid separator for detecting an end position of the piston. The use of a second limit switch for detecting the end position of the piston of the fluid separator, permits a further reduction in the cyclical time needed for the pressure increasing operation since no waiting times will have to be provided to insure that the piston has reached its end position before the return of the piston into its initial position is initiated, thereby permitting a further reduction in the cyclical time both in a fluid separator of the type provided with an output pressure chamber and in a fluid separator having a tandem-type configuration.

Finally, the use of limit switches involves the additional advantage that the strokes of the piston required for a predetermined pressure increase, i.e., the individual pressure increasing processes, are detected by a suitable electronic circuit which counts the number of switch pulses of the limit switches for comparison with a corresponding nominal number. This comparison serves to check the operation of the level regulator.

BRIEF DESCRIPTION OF THE DRAWING

The invention will now be described in closer detail with reference to the drawing, wherein.

DETAILED DESCRIPTION OF A PREFERRED EMBODIMENT

Figure 1:
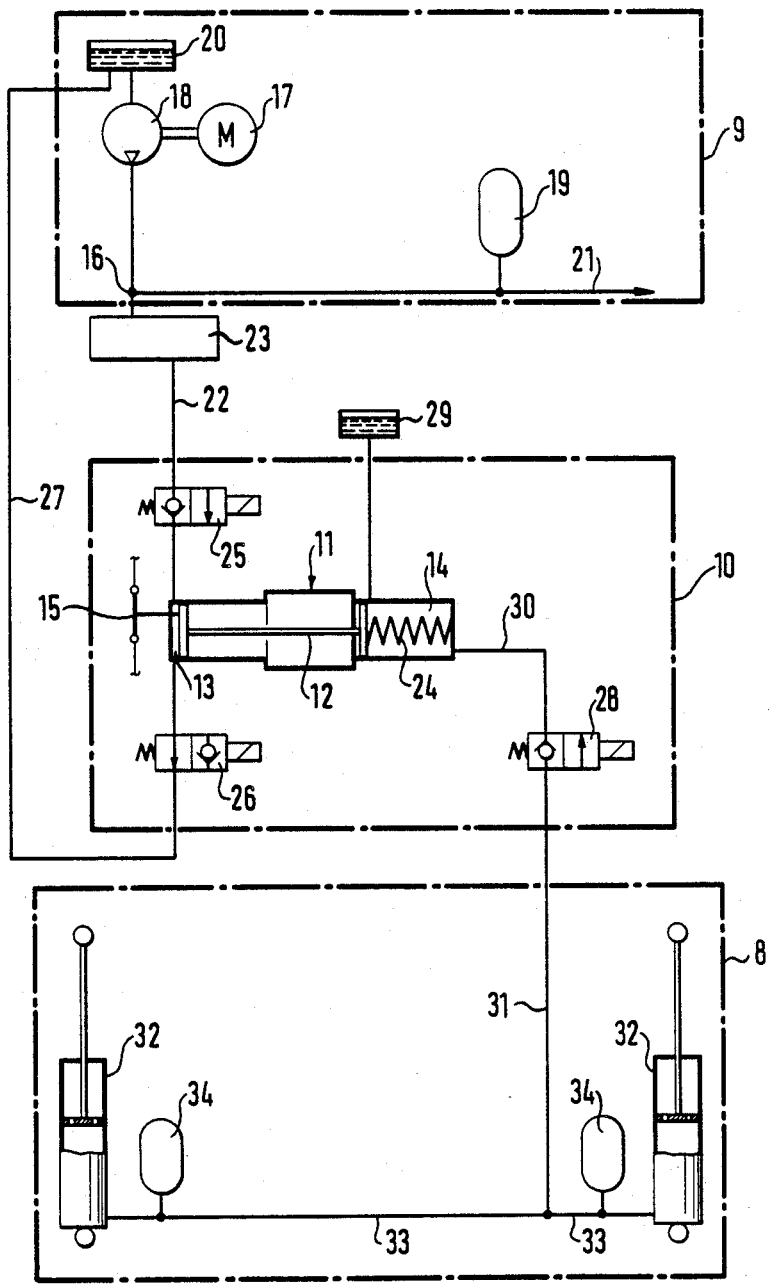
FIG. 1 is a hydraulic schematic diagram of a level regulator for automotive vehicles according to the invention.

In the various Figures of the drawing, corresponding units are designated by the same reference numerals.

According to FIG. 1, a level adjusting device 8 associated with an axle of an automotive vehicle (not shown) is in communication with a pressure output 16 of a hydraulic pressure source 9 through a fluid separator 10.

The hydraulic pressure source 9 includes a pressure pump 18 actuated by a motor 17, with the discharge side of the pump being in communication with an accumulator 19 and the pressure output 16 of the hydraulic pressure source 9. Connected to the intake side of the pump 18 is a brake fluid return flow reservoir 20. A brake fluid conduit 21 leads from the pressure output 16 to a brake system of the vehicle.

Disposed in a connecting conduit 22 leading from the auxiliary hydraulic pressure source 9 to the fluid separator 10, is a separating switch valve 23 which separates the fluid separator 10 from the auxiliary hydraulic pressure source 9 when brake pressure is to be supplied to the brake system of the automotive vehicle from the hydraulic pressure source 9.

The fluid separator 10 comprises a hydraulic cylinder 11 in which a hydraulic piston 12 separates an input pressure chamber 13 from am output pressure chamber 14, with the hydraulic piston 12 being preloaded by a restoring spring 24 against the pressure in the input pressure chamber 13 into its initial at rest position, as shown in FIG. 1.

The input pressure chamber 13 of the hydraulic cylinder 11, through an electromagnetically actuable first switch valve 25 and the connecting conduit 22, can be connected to the hydraulic pressure source 9. the first switch valve 25, in its first switching position, as shown in the drawing, acts as a check valve blocking the connecting conduit 22 in a direction from the hydraulic pressure source 9 to the fluid separator 10 and, in its second switching position, open the conduit 22. Through an electromagnetically actuable second switching valve 26, which is normally open, and a brake fluid return conduit 27, the inlet pressure chamber 13 is in communication with the brake fluid return reservoir 20 of the hydraulic pressure source 9. The second switch valve 26, in the second switching position thereof, acts as a check valve blocking the connection in a direction from the inlet pressure chamber 13 fo the cylinder 11 to the brake fluid return flow reservoir 20.

The outlet pressure chamber 14 of the cylinder 11, through an output conduit 30 and a third electromagnetically actuable switch valve 28 which in its normal position acts as a check valve, is connected to a level adjusting circuit of the level adjuster 8 and applies hydraulic pressure, for example, to partly-supporting spring struts 32 at the rear wheels of the automotive vehicle. Respectively located in the feed-in lines 33 leading to each partly-supporting spring strut is a pressure accumulator 34 which attenuates pressure fluctuations and precludes excessively rapid pressure decrease.

Associated with one of the partly-supporting spring struts 32 is a level generator (not shown) which generates and sends an electric signal corresponding to the actual level of the wheel axle concerned, to an electrical circuit (not shown either) operating the switch valves 25, 26, 28.

The fluid separator 10, in addition, includes a limit switch 15 connected to the electrical circuit which monitors the initial position of the hydraulic piston 12.

Figure 2:
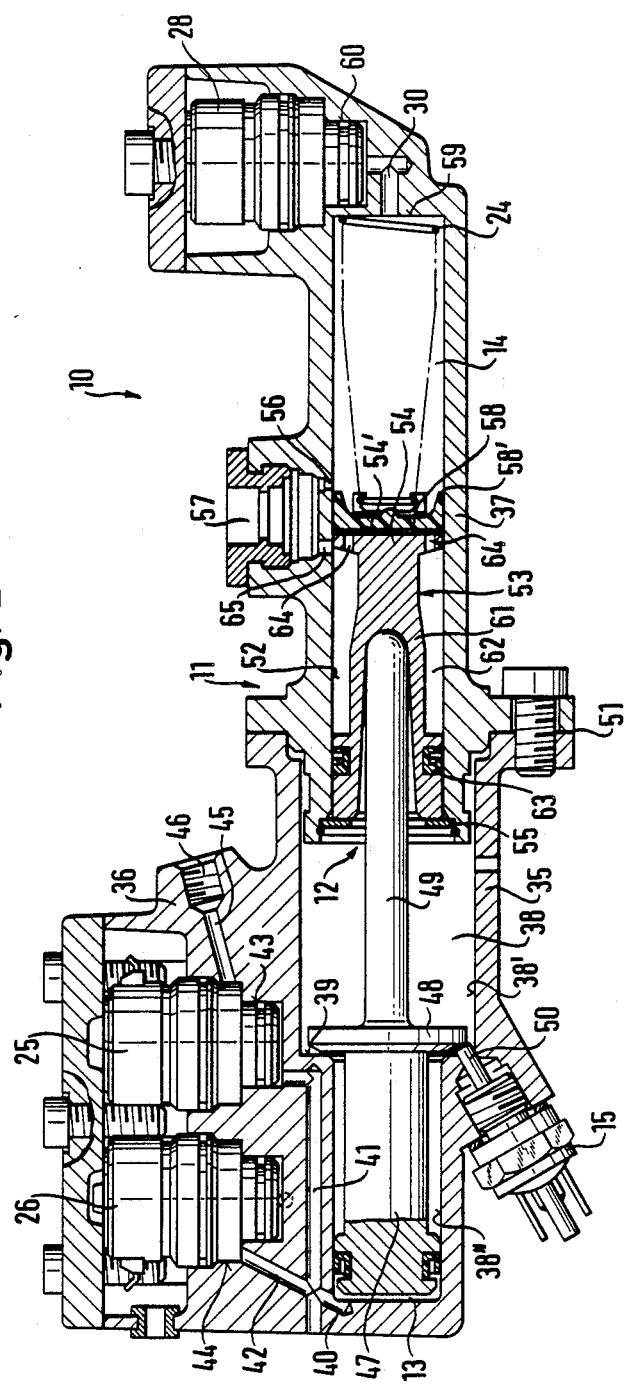
FIG. 2 is a longitudinal section through a fluid separator for a level regulator according to FIG. 1 showing details of construction.

According to FIG. 2, the hydraulic cylinder 11 of the fluid separator 10 comprises an input cylindrical housing 35 integrally formed with a switch valve block 36, and an output cylindrical housing 37 flanged to the input housing 35.

Provided in the input cylindrical housing 35 is an axial step bore 38 comprising a separating section 38' facing the output cylindrical housing 37, with the separating section 38', at the end thereof facing away from the output cylindrical housing 37, opening into a pressure chamber section 38" of reduced diameter, thereby forming a shoulder 39. A bore 40 in communication with an inlet bore 41 and an outlet bore 42 terminates in the pressure chamber section 38" at the end thereof facing away from the separating section 38".

The inlet bore 41 leads to a first valve accommodating chamber 43 for the first switch valve 25, while the outlet bore 42 leads to a second valve accommodating chamber 44 disposed in which is the second switch valve 26. The first valve receiving chamber 43 leads to a connecting bore 45 to a connection 46 for the connecting conduit 22. The second valve receiving chamber 44 is in communication, in a manner not shown, with the brake fluid return conduit 27.

Guided in the pressure chamber section 38''', in sliding and tight manner, is a first piston portion 47 to seal and confine the input pressure chamber 13. At the end facing away from the input pressure chamber 13, the first piston portion 47 passes over into a radial flange 48 joined by a pushrod 49.

Located in the area of the shoulder 39 is the limit switch 15 which, in the area of the shoulder 39, includes a switch plunger 50 which protrudes into the separating section 38'. Pressure is applied to the switch plunger 50 by the radial flange 48 when the piston portion 47 is in its initial position.

The output cylindrical housing 37 is secured by means of a flange connection 51 to the input cylindrical housing 35, and includes a cylindrical bore 52 of constant diameter in which is provided a second piston portion 53 to which pressure is applied by the first piston portion 47 through the pushrod 49 to thereby form the hydraulic piston 12.

The second piston portion 53 includes a central section 61 of reduced diameter so that an annular chamber 62 surrounding the central section is formed in the cylindrical bore 52. The annular chamber 62, at the end thereof facing away from the output pressure chamber, 14 is sealed by a sliding seal 63. At the end of the second piston portion 53 facing the output pressure chamber there is provided a front flange 54 having axial passage bores 64. Disposed on the front face 54' of the front flange 54 is a plate-type seal 58 including a seal lip 58' forming, along with the axial bores 64, a check valve interconnecting the annular chamber 62 and the output pressure chamber 14.

Above the central area of the plate-type seal 58, the restoring spring 24 is supported on the second piston portion 53 to force the second piston portion 53 into its initial position wherein it is in abutment with a stop 55.

In the central area of the cylindrical bore 52, a passage opening 56 terminates in the output pressure chamber 14 leading to a connection for the connecting conduit to the level regulating-return flow reservoir 29. The passage opening 56 is arranged so as to be just uncovered by the seal lip 58' with the piston portion 53 and, hence, the hydraulic piston 12 in its initial position and is closed, as soon as the piston 12 is displaced even slightly from its initial position. A second passage opening 65 terminates in the cylindrical bore 52 so as to cause the connection 57 to be always in communication with the annular chamber 62.

The output conduit 30 leading to a valve accommodating chamber 60 for the third switch valve 28, terminates in the bottom 59 of the cylindrical bore 52. Connected to the valve accommodating chamber 60 (in a manner not shown) is the level adjusting circuit 31.

The operation of the level regulator illustrated in FIGS. 1 and 2 will now be described with reference thereto:

Once the level generator (not shown) has detected on a spring strut 32 position indicating that the axle level has decreased below a nominal value, a corresponding signal is supplied to the electrical circuit to thereby cause an increase in the hydraulic pressure in the spring struts 32 and, hence, a rise in the axle level. The electrical circuit will then supply switch signals to the first and to the second switch valve 25 and 26, respectively.

The switch signals from the electrical circuit will re-switch the two switch valves 25, 26 such that the inlet pressure chamber 13 is in communication with the hydraulic pressure source 9 and will be separated from the brake fluid return reservoir 20. Due to the brake fluid pressure prevailing in the inlet pressure chamber 13, the hydraulic piston 12 is displaced against the restoring force of the spring 24, with the seal lip 58' of the plate-type seal 58 separating the passage opening 56 from the outlet pressure chamber 14. As a result of further displacement of the piston 12, the hydraulic fluid contained in the output pressure chamber 14, is forced into the level adjusting circuit 31 through the third switch valve 28 taking its check position, wherein it causes a pressure increase requiring the actuating time $t_B$. Subsequently, the piston 12 will remain in its end position for a dwell time $t_V$. At the end of the dwell time $t_V$, the switch valves 25, 26 are reswitched to their initial position so that the input pressure chamber 13 is separated from the hydraulic pressure source 9 to be connected to the brake fluid-return flow reservoir 20. Thereupon, the restoring spring 24 can force the piston 12 back into its initial position, with hydraulic fluid flowing from the level regulating return flow reservoir 29 through the connection 57, the passage opening 65, the annular chamber 62 and the check valve formed by the axial bores 64 and the plate-type seal 58, into the output pressure chamber 14. This will require a resuction time $t_N$. Once the piston 12 reassumes its initial position wherein the radial flange 48 actuates the limit switch 15 through the switch plunger 50, the limit switch 15 supplies a signal to the electrical circuit indicating that condition. Thereupon, the electrical circuit reapplies pressure to the switch valves 25, 26 to repeat the pressure increasing process.

The afore-described pressure increasing process is repeated in the same manner until the spring struts 32 are under the pressure required to place the actual axle level to the nominal axle level.

Figure 5:
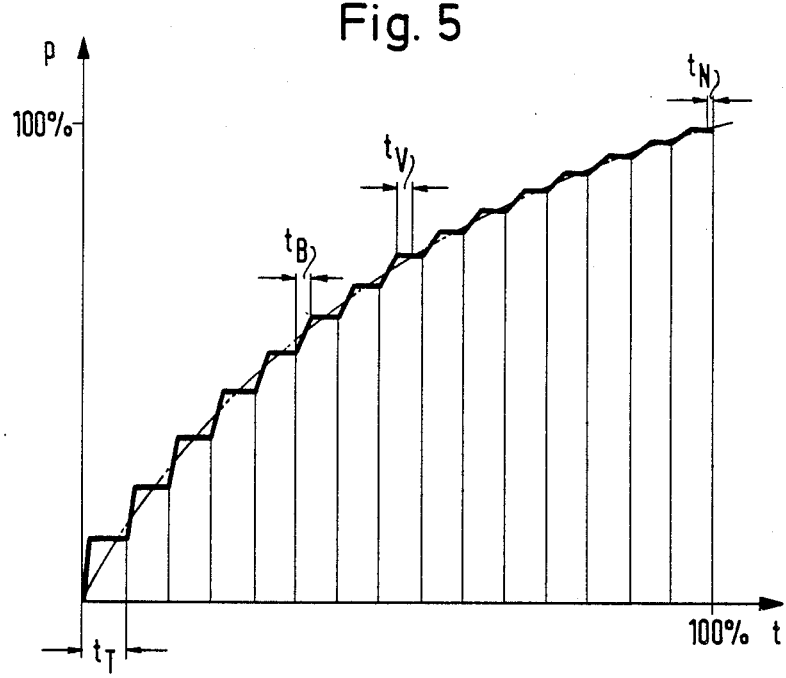
FIG. 5 is a pressure-versus-time diagram showing the pressure build-up in the level regulator, using a fluid separator according to FIG. 1.

Plotted in the diagram of FIG. 5 is the pattern of the hydraulic pressure p in the spring struts versus time t.

If, conversely, the level generator detects that the actual axle level is above the nominal axle level, it again supplies a corresponding signal to the electrical circuit causing reswitching of the third switch valve 28 into its open position. The level adjusting circuit 31 is thereby connected, through the outlet conduit 30, to the output pressure chamber 14 and, additionally, through the passage opening 56, to the level regulating-return flow reservoir 29. This allows hydraulic fluid to flow from the level adjusting circuit 31 to the level regulating-return flow container 29 until the required pressure decrease has been reached and the level generator indicates that the actual axle level corresponds to the nominal axle level. Thereafter, the third switch valve 28, again, is reswitched to its normal position in which it acts as a check valve and maintains the pressure in the level adjusting circuit 31.

Figure 3:
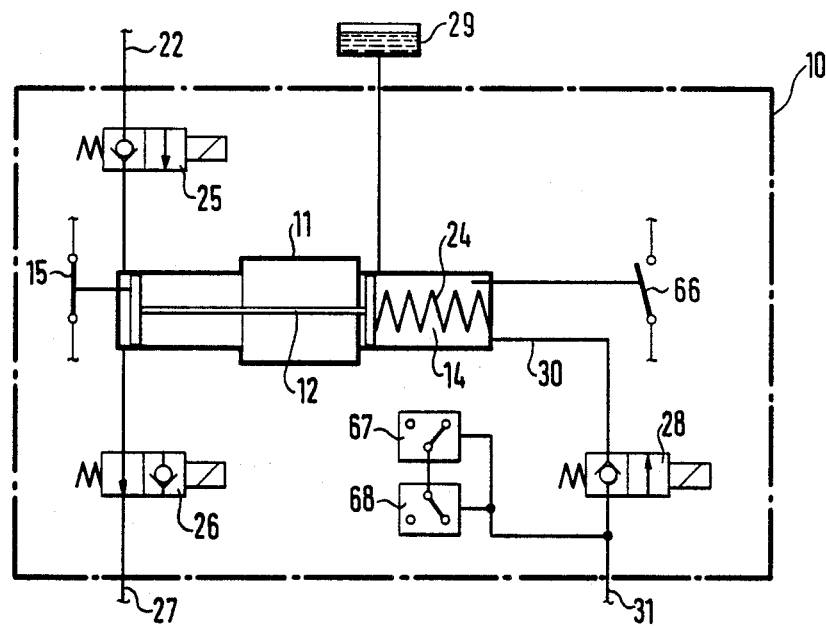
FIG. 3 is a schematic hydraulic diagram of another fluid separator for a level regulator according to FIG. 1.

FIG. 3 shows another fluid separator 10 for a level regulator according to FIG. 1, wherein a second limit switch 66 is provided to which pressure is applied by the piston 12 when the piston is in its end position.

This fluid separator 10 is also provided with a first and a second pressure switch 67 and 68, respectively, to which pressure is applied by the level adjusting circuit 31 to preclude a pressure increase in the level adjusting circuit 31 beyond a maximum value and a pressure decrease below a minimum value, respectively, irrespective of the output signal of the level generator.

Figure 6:
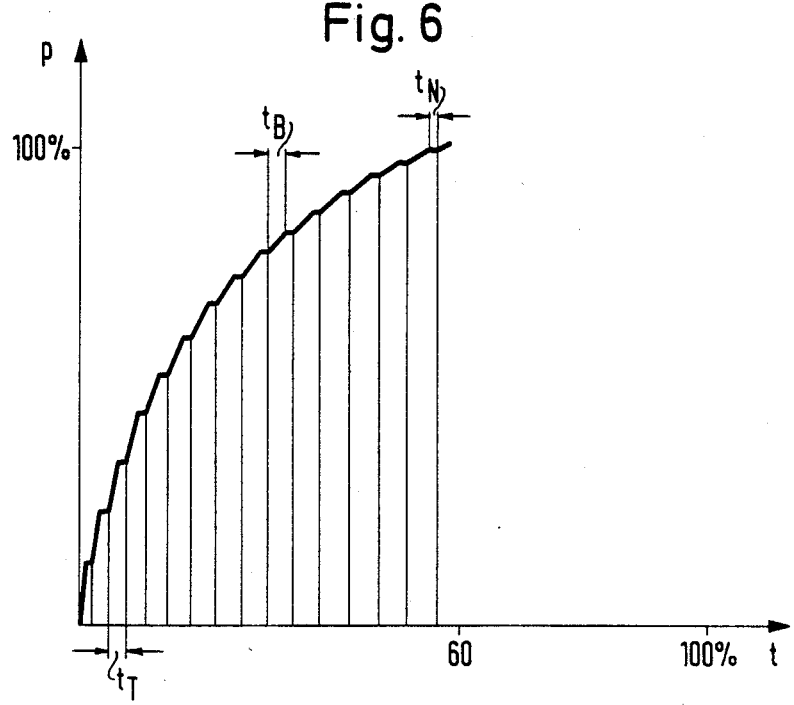
FIG. 6 is a pressure-versus-time diagram similar to that of FIG. 5, for a fluid separator according to FIG. 3.
Figure 7:
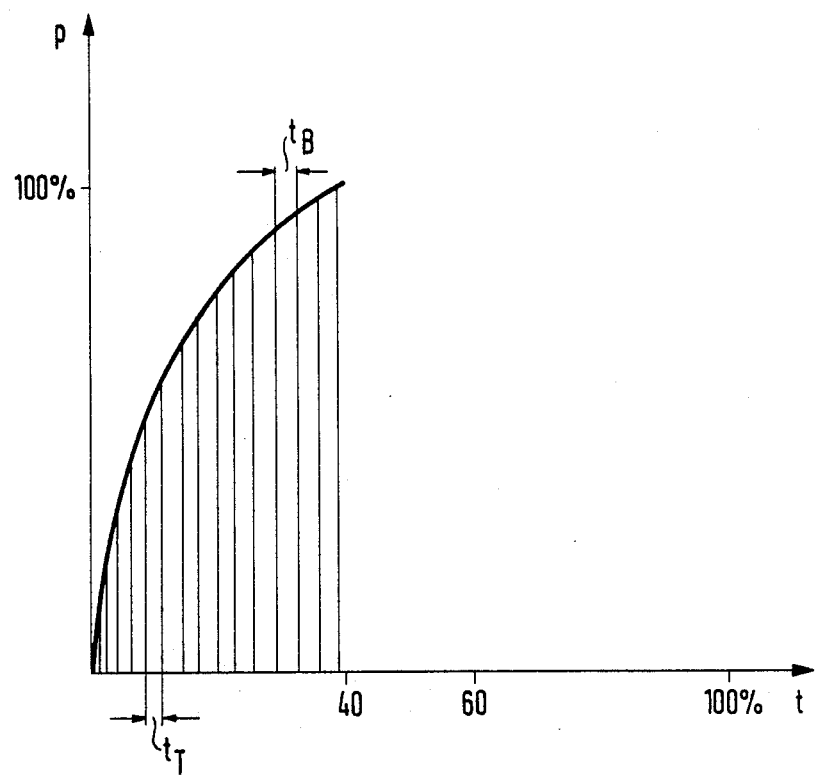
FIG. 7 is a pressure-versus-time diagram similar to that of FIG. 5, for a fluid separator of FIG. 4.

A level regulating system, using a fluid separator 10 as shown in FIG. 3, operates as follows:

When the level generator, upon sensing a decrease in the actual axle level below the nominal axle level, supplies a signal to the electrical circuit, the latter will cause the first and second switch valves 25, 26 to re-switch causing a pressure increase to take place in the adjusting circuit 31 as described above. However, if the piston 12 now reaches its end position, the second limit switch 66 supplies a signal indicative of that condition to the electrical circuit which immediately upon reaching its end position, through the piston 12, switches back the switch valves 25, 26 into their normal position to thereby enable the piston 12 to be returned to its initial position, through the restoring spring 24, thereby reducing the dwell time $t_V$ in which the piston 12 is in its end position such that the cyclical time $t_1$ which is composed of the actuating time $t_B$, the dwell time $t_V$ and the resuction time $t_N$, is reduced by the amount of the dwell time $t_V$. As shown in FIG. 6, wherein the time versus pressure increase for a level regulator using the fluid separator 10 according to FIG. 3 is shown, the time required for the pressure increase can be thus reduced by more than 40%.

Figure 4:
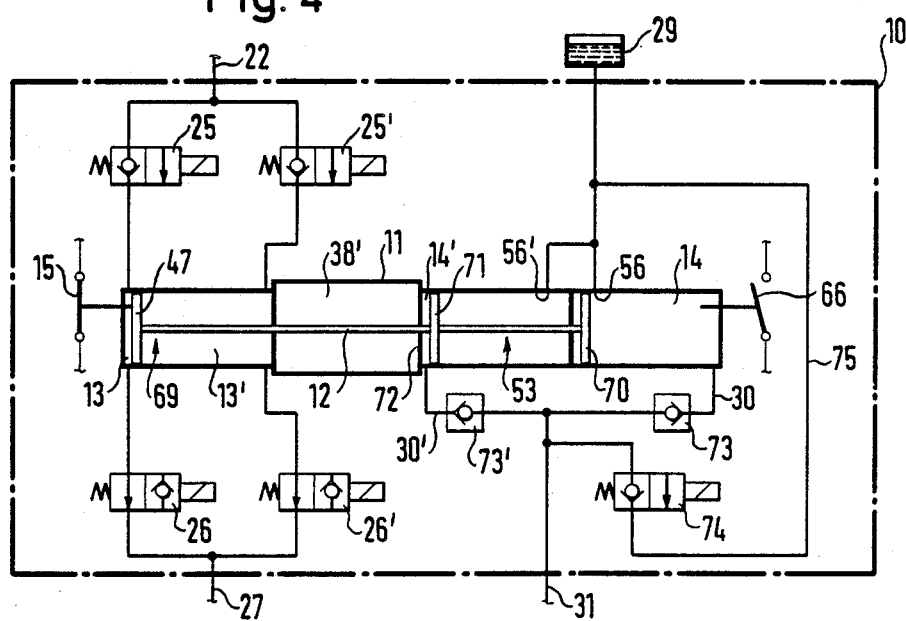
FIG. 4 is a schematic hydraulic diagram of a fluid separator of tandem-type configuration.

FIG. 4 shows a fluid separator 10 for a level regulator having a tandem-type configuration, comprising a hydraulic cylinder 11 including, on the input side thereof, a pressure chamber 69 wherein the first piston portion 47 separates the first input pressure chamber 13 from a second input pressure chamber 13'. On the output side of the cylinder 11, the first output pressure chamber 14 is sealed by a first piston section 70 of the second piston portion 53. Enclosed between a second piston section 71 of the second piston portion 53 and a partition 72 disposed on the side of the output section of the cylinder 11 facing the input side, is a second output pressure chamber 14'.

The connecting conduit 22 leading to the hydraulic pressure source 9, can be connected to the first input pressure chamber 13 through the first switch valve 25, and through the second switch valve 26, with the brake fluid-return flow conduit 27. Similarly, the connecting conduit 22 can be connected to the second input pressure chamber 13' through an inlet switch valve 25', which, through another outlet switch valve 26' is normally in communication with the return conduit 27. The outlet pressure chambers 14, 14', through passage openings 56 and 56', respectively, are in communication with the level regulating-return flow reservoir 29, and the passage opening 56 which terminates in the first outlet pressure chamber 14 and is located such that it is just released by the first piston section 70 of the second piston portion 53 when the piston 12 is in its initial position, and is thus separated from the first input pressure chamber 14 when the piston 12 is displaced toward its end position. Similarly, the passage opening 56' which terminates in the second output pressure chamber 14' is arranged such that it is released by the second piston section 71, when the piston 12 is in its end position, and is separated from the second output pressure chamber 14', when the piston 12 is displaced toward its initial position.

Output conduits 30 and 30', respectively, lead from the two outlet pressure chambers 14, 14', through check valves 73, 73', to the level regulating circuit 31. Through a pressure decreasing switch valve 74 which functions in its normal position as a check valve, the level adjusting circuit 31 is in communication with a return conduit 75 leading to a level regulating-return flow reservoir 29.

Finally, the first and second limit switches 15 and 66, respectively, are located on the cylinder 11 to detect the initial and the end position respectively, of the piston 12.

The fluid separator 10 described with reference to FIG. 4 operates as follows:

To increase the pressure in the level adjusting circuit 31, first the first and the second switch valve 25 and 26, respectively, are reswitched such that the first input pressure chamber 13 is in communication with the hydraulic pressure source 9 and is separated from the brake fluid-return flow reservoir 20. The second input pressure chamber 13, through the outlet switch valve 26', is in communication with the brake fluid return conduit 27 and thus is non-pressurized. The hydraulic piston 12 is thereby displaced from its initial position into its end position, with the hydraulic fluid contained in the first output pressure chamber 14, being forced into the level adjusting circuit 30 through the output conduit 30 and the check valve 73. At the same time, the second output pressure chamber 14' is filled with hydraulic fluid. Once the piston 12 has reached its end position, the second limit switch 66 is closed to generate a switching signal which is applied to the electrical circuit.

The electrical circuit now reswitches the switch valves 25, 25', 26, 26' associated with the input side of the fluid separator 10 such that the first input pressure chamber 13 is separated from the hydraulic pressure source 9 and is in communication with the brake fluid-return flow reservoir 20. At the same time, the second input pressure chamber 13' is in communication with the hydraulic pressure source 9, through the inlet switch valve 25' which assumes its passage position, and is separated, through the outlet switch valve 26', from the brake fluid-return flow reservoir 20. The brake fluid pressure prevailing in the second inlet pressure chamber 13' thereby causes the piston 12 to be restored from its end position into its initial position, with the second piston section 71 of the second piston portion 53 forcing the hydraulic fluid contained in the second output pressure chamber 14', through the output conduit 30' and the second check valve 73', into the level adjusting circuit 31. At the same time, during this displacement, the first output pressure chamber 14 is refilled with hydraulic fluid from the level regulating-return flow reservoir 29. Once the piston 12 has re-reached its initial position, the first limit switch 15 is closed thereby supplying a corresponding signal to the electrical circuit to indicate that the operation can be repeated. As shown in the pressure-versus-time diagram of FIG. 6, the time required for a desired pressure build-up to take place in the level adjusting circuit 31 of the level regulator 8, as compared with the time required with a fluid separator 10 according to FIG. 1, is thereby reducible by more than 60%, since, in addition to the dwell time $t_V$, the re-suction time $t_N$ is also eliminated so that the cyclical time $t_T$ will correspond solely to the actuating time $t_B$, during which respectively a pressure increase will take place in the level adjusting circuit 31.

Using at least one limit switch 15 with the fluid separators 10 as described in the afore-going will permit detection of the number of strokes of the piston 12 required to increase the pressure in the level adjusting circuit 31 from a predetermined lower value to a predetermined upper value. When the number of strokes required to achieve the corresponding pressure increase substantially corresponds to a predetermined number, the level controller is known to be in proper order. This test process, during maintenance service, can be performed by a diagnostic computer in the automotive vehicle in conjunction with an external service computer.

If the test reveals that the number of strokes detected substantially differs from the predetermined number, this will be indicative of an error in the level regulator. A difference of this type could, for example be due to a lack of hydraulic fluid in the level regulating-return flow reservoir 29, to leakage in the level regulating system or to a defective hydraulic pressure source 9.

What is claimed is:

1. A level regulator for automotive vehicles, comprising, in combination: a hydraulically operating level adjusting device associated with at least one axle of the automotive vehicle, a fluid separator provided with a hydraulic cylinder wherein at least one inlet pressure chamber, through a hydraulic piston to which a restoring force acting against the pressure in the inlet pressure chamber is applied is separated from at least one outlet pressure chamber connectable to the level adjusting device, the inlet pressure chamber through at least one switch valve being connectable temporarily to a hydraulic pressure source of the vehicle, said level adjusting device being normally connected to a hydraulic fluid return reservoir, wherein the fluid separator comprises an input cylindrical housing in which is disposed a first piston portion adapted to close the first inlet pressure chamber, an output cylindrical housing attached to the input cylindrical housing and accommodating a second piston portion adapted to close the outlet pressure chamber, the first piston portion mounted to apply pressure to the second piston portion through a pushrod.

2. The level regulator according to claim 1, wherein the input cylindrical housing includes a stepped bore including a pressure chamber section and a separating section, the separating section being of a substantially larger cross-section than the pressure chamber section and the pushrod being substantially located in the separating section.

3. The level regulator according to claim 1, wherein the input cylindrical housing is flanged to the output cylindrical housing.

4. The level regulator according to claim 1, wherein a passage is provided in the output cylindrical housing, said passage opening in communication with a level regulating return reservoir and terminating in the outlet pressure chamber adjacent to a seal on the second piston portion of the piston wherein said seal seals the outlet pressure chamber and blocks said passage opening upon displacement of the piston from an initial position.

5. The level regulator according to claim 4, wherein the second piston portion comprises a central portion of reduced cross-section forming an annular chamber surrounding the second piston portion, said annular chamber connectable to the outlet pressure chamber through a check valve between said annular chamber and said outlet pressure chamber, said annular chamber being in communication with the level regulating return reservoir.

6. The level regulator according to claim 5, wherein the check valve is formed by an axial bore provided in a front flange of the second piston portion and a plate-type seal on said second piston portion at said axial bore.

7. The level regulator according to claim 1, wherein pressure is applied to the hydraulic piston of the fluid separator by a restoring spring.

8. The level regulator according to claim 1, wherein the first piston portion of the fluid separator includes two sides to which pressure can be applied, said first piston portion being in a pressure chamber and separating the first inlet pressure chamber from a second inlet pressure chamber and the second piston portion includes a first and a second piston section adapted to close the first and a second outlet pressure chamber, respectively, wherein the two outlet pressure chambers are each in communication with a level adjusting circuit of the level adjusting device through separate check valves.

9. A level regulator for automotive vehicles, comprising a hydraulically operating level adjusting device associated with at least one axle of the automotive vehicle, a fluid separator provided with a hydraulic cylinder wherein at least one inlet pressure chamber, through a hydraulic piston to which a restoring force acting against the pressure in the inlet pressure chamber is applied is separated from at least one outlet pressure chamber connectable to the level adjusting device, the inlet pressure chamber through at least one switch valve being connectable temporarily to a hydraulic pressure source of the vehicle, said level adjusting device being normally connected to a hydraulic fluid return reservoir, wherein the fluid separator comprises an input cylindrical housing in which is disposed a first piston portion adapted to close the first inlet pressure chamber, an ouput cylindrical housing attached to the input cylindrical housing and accommodating a second piston portion adapted to close the outlet pressure chamber, the first piston portion mounted to apply pressure to the second piston portion through a pushrod, wherein the input cylindrical housing includes a stepped bore including a pressure chamber section and a separating section, the separating section being of a substantially larger cross-section than the pressure chamber section and the pushrod being substantially located in the separating section, and wherein a first limit switch is mounted on the fluid separator for contact with said hydraulic piston to indicate an initial position of the hydraulic piston.

10. The level regulator according to claim 9, wherein the limit switch is located on the input cylindrical housing.

11. The level regulator according to claim 10, wherein the limit switch comprises a switch plunger protruding into the separating section of the stepped bore and cooperating with a radial flange provided on the first piston portion of the piston.

12. The level regulator according to claim 11, wherein the switch plunger protrudes into the separating section at an end of the separating section adjacent the pressure chamber section.

13. A level regulator for automotive vehicles, comprising a hydraulically operating level adjusting device associated with at least one axle of the automotive vehicle, a fluid separator provided with a hydraulic cylinder wherein at least one inlet pressure chamber, through a hydraulic piston to which a restoring force acting against the pressure in the inlet pressure chamber is applied is separated from at least one outlet pressure chamber connectable to the level adjusting device, the inlet pressure chamber through at least one switch valve being connectable temporarily to a hydraulic pressure source of the vehicle, said level adjusting device being normally connected to a hydraulic fluid return reservoir, wherein the fluid separator comprises an input cylindrical housing in which is disposed a first piston portion adapted to close the first inlet pressure chamber, an output cylindrical housing attached to the input cylindrical housing and accommodating a second piston portion adapted to close the outlet pressure chamber, the first piston portion mounted to apply pressure to the second piston through a pushrod, further including a switch valve block provided on the input cylindrical housing accommodating first and second switch valves associated with the inlet pressure chamber.

14. The level regulator according to claim 13, wherein the switch valve block is formed integrally with the input cylindrical housing.

15. The level regulator according to claim 13, further including a valve accommodating chamber provided in the output cylindrical housing a third switch valve in said valve accommodating chamber associated with the outlet pressure chamber.

16. The level regulator according to claim 15, wherein the third switch valve is an electromagnetically operable 2-way/2-position valve which in an operative position acts as a check valve and in an operative position 17. A level regulator for automotive vehicles, comprising a hydraulically operating level adjusting device associated with at least one axle of the automotive vehicle, a fluid separator provided with a hydraulic cylinder wherein at least one inlet pressure chamber, through a hydraulic piston to which a restoring force acting against the pressure in the inlet pressure chamber is applied is separated from at least one outlet pressure chamber connectable to the level adjusting device, the inlet pressure chamber through at least one switch valve being connectable temporarily to a hydraulic pressure source of the vehicle, said level adjusting device being normally connected to a hydraulic fluid return reservoir, wherein the fluid separator comprises an input cylindrical housing in which is disposed a first piston portion adapted to close the first inlet pressure chamber, an output cylindrical housing attached to the input cylindrical housing and accommodating a second piston portion adapted to close the outlet pressure chamber, the first piston portion mounted to apply pressure to the second piston portion through a pushrod, wherein the first piston portion of the fluid separator includes two sides to which pressure can be applied, said first piston portion being in a pressure chamber and separating the first inlet pressure chamber from a second inlet pressure chamber and the second piston portion includes a first and a second piston section adapted to close the first and a second outlet pressure chamber, respectively, wherein the two outlet pressure chambers are each in communication with a level adjusting circuit of the level adjusting device through separate check valves, and, further including a limit switch for detecting an end position of the piston located on the fluid separator.

* * * * *